United States Patent [19]
Lange

[11] Patent Number: 5,711,373
[45] Date of Patent: Jan. 27, 1998

[54] METHOD FOR RECOVERING A HYDROCARBON LIQUID FROM A SUBTERRANEAN FORMATION

[75] Inventor: Elaine Austin Lange, Bellaire, Tex.

[73] Assignee: Exxon Production Research Company, Houston, Tex.

[21] Appl. No.: 599,910

[22] Filed: Feb. 12, 1996

Related U.S. Application Data

[60] Provisional application No. 60/000,759 Jun. 30, 1995.
[51] Int. Cl.⁶ .................. E21B 43/22; E21B 47/10
[52] U.S. Cl. ................. 166/252.2; 73/152.41; 166/401; 166/402
[58] Field of Search .................. 166/252.1, 252.2, 166/268, 273, 274, 400, 401, 402; 73/152.41

[56] References Cited

U.S. PATENT DOCUMENTS

| | | | |
|---|---|---|---|
| Re. 28,963 | 9/1976 | Fertl et al. | 166/252.2 |
| 3,268,000 | 8/1966 | Dumore | 166/252.1 |
| 3,319,713 | 5/1967 | Moore | 166/252.2 |
| 4,102,396 | 7/1978 | Ransom et al. | 166/252.2 |
| 4,181,176 | 1/1980 | Frazier | 166/252.1 |
| 4,397,181 | 8/1983 | Caldwell | 73/152.41 X |
| 4,899,817 | 2/1990 | Djabbarah | 166/252.1 |

*Primary Examiner*—George A. Suchfield
*Attorney, Agent, or Firm*—Kurt D. Van Tassel

[57] ABSTRACT

The invention disclosed herein is a method for producing oil from a reservoir after predetermining its residual oil saturation, $S_{orm}$. Such a method would displace a hydrocarbon fluid in a subterranean formation using a substantially non-aqueous displacement fluid after a waterflood. The non-aqueous displacement fluid can be introduced as a single bank, in alternating sequence with water, or by other means. The method predetermines $S_{orm}$ using the difference in the solubility parameters between the hydrocarbon liquid in the formation and the displacement fluid to be used for displacing the hydrocarbon fluid. The solubility parameter of the hydrocarbon liquid can be determined by a variety of methods including, but not limited to, (1) using the hydrocarbon liquid's energy of vaporization, $\Delta E_{vap}$, and its molar volume, V, (2) using the volume-fraction-weighted average of the solubility parameter values for model compounds representing components of the hydrocarbon liquid, or (3) using the hydrocarbon liquid's average molecular weight and the temperature of the subterranean formation. The solubility parameter of the and a constant, $\rho r(liq)$ for a displacement fluid that is a pure compound, or (2) using the volume-fraction-weighted average of the solubility parameter values for each component of the displacement fluid. Residual oil saturation for a secondary displacement fluid also can be determined by a number of methods including, but not limited to, (1) using the displacement fluid's critical pressure, $P_c$, ratio of density to critical density, $\rho r$, gasflood, Sorg, may also be predetermined using a substantially similar procedure.

6 Claims, 1 Drawing Sheet

METHOD FOR RECOVERING A HYDROCARBON LIQUID FROM A SUBTERRANEAN FORMATION

This application is based on copending U.S. provisional application, Ser. No. 60/000,759, filed in the name of Elaine Austin Lange on Jun. 30, 1995.

FIELD OF THE INVENTION

The present invention relates to a process for recovering a hydrocarbon liquid from a subterranean formation by introducing a substantially non-aqueous displacement fluid or by introducing a substantially non-aqueous displacement fluid in alternating sequence with water. More specifically, the invention relates to a method for predetermining the amount of hydrocarbon liquid that will remain in the formation after the non-aqueous displacement fluid is introduced.

BACKGROUND OF THE INVENTION

An oil reservoir consists of a subterranean formation with small interconnected pore spaces filled with hydrocarbon liquid, gas, and water that usually exists at an elevated pressure. The hydrocarbon liquid phase at the reservoir temperature and pressure will hereafter be termed "oil" for brevity and convenience. The hydrocarbon liquid phase includes conventional liquid crude oils and liquid crude oils containing dissolved gases (e.g., methane($CH_4$), ethane ($C_2H_6$), propane($C_3H_8$), butanes ($C_4H_{10}$), carbon dioxide ($CO_2$), nitrogen ($N_2$) and hydrogen sulfide ($H_2S$)). The volume fraction of each phase in the pore space is commonly referred to as the "saturation" of the fluid. Knowledge of the saturations of oil and gas in the formation is needed throughout the life of the oil field to formulate strategies for optimal economic oil recovery.

Initially, oil is produced by "primary" production methods that utilize the high pressure of the fluids within the formation. As an example, primary production can occur by fluid expansion upon a decrease in reservoir pressure.

A high oil saturation usually remains after primary production and "secondary" recovery techniques are often implemented to recover additional oil. The most common secondary recovery process is a "waterflood" in which large volumes of water are injected into the reservoir through specified wells to physically displace oil toward production wells in the vicinity. A high oil saturation may also remain in the reservoir after a waterflood as a result of high oil-water interfacial tension which leads to trapping of oil droplets in the pore spaces. The residual oil saturation after a waterflood is commonly labeled "waterflood-residual-oil saturation". The residual oil saturation after a waterflood can be measured in the subterranean formation by logging and coring techniques, or through chemical tracer methods, as described in U.S. Pat. No. 4,158,957 issued Jun. 26, 1979 to H. A. Deans and J. R. Bragg.

Another secondary recovery process involves injection of high pressure (i.e., >about 500 psia [3.45 MPa]) substantially non-aqueous displacement fluids, hereafter referred to as a "secondary gasflood". These non-aqueous displacement fluids may be high pressure (i.e., >about 500 psia [3.45 MPa]) gases, supercritical fluids, or liquified light hydrocarbons. The residual oil saturation after this process is denoted herein as "$S_{org}$".

"Tertiary" recovery techniques are sometimes employed after a waterflood to recover additional oil, and thus further reduce oil saturation in the formation. One well-known tertiary recovery technique is surfactant flooding, involving injection of a dilute aqueous solution of one or more surfactants to lower the oil-water interfacial tension.

A second widely used tertiary recovery technique involves injection of substantially non-aqueous displacement fluids at high pressures (i.e., >about 500 psia [3.45 MPa]) after a waterflood. These processes are commonly termed "tertiary gasfloods", "tertiary gas injection processes", "miscible enhanced oil recovery processes", "near-miscible enhanced oil recovery processes", or "immiscible enhanced oil recovery processes". Hereafter, these tertiary processes will be referred to collectively as "tertiary gas injection processes". The "non-aqueous displacement fluids" discussed herein include high pressure (i.e., >about 500 psia [3.45 MPa]) gases, supercritical fluids, and liquified light hydrocarbons. The displacement fluids may be pure compounds or mixtures of various compounds, as in liquified petroleum gas. A supercritical state for a substance exists when the temperature exceeds the critical temperature for the substance and when the pressure also exceeds the critical pressure for the substance. A supercritical fluid has properties, such as density, which are intermediate between that of a liquid state and a gas state.

Non-aqueous displacement fluids for "tertiary gas injection processes" include, but are not limited to, carbon dioxide, methane, ethane, propane, nitrogen, and mixtures of these or other fluids. The displacement fluid can be injected as one bank, referred to as a "slug" process, or in alternating sequence with water. The latter process is commonly abbreviated "WAG" process or "water-alternating-gas" process. Oil is recovered by a variety of mechanisms from injection of these non-aqueous fluids. Proposed recovery mechanisms include low interfacial tension displacement, oil swelling, oil viscosity reduction and extraction of oil components from isolated oil droplets by the displacement fluid. The non-aqueous displacement fluids can also be introduced into the reservoir by chemical reaction or biological processes.

In some cases, the angle of steeply-dipping reservoirs can be used to advantage by injecting the non-aqueous displacement fluid in the upper portion of the formation, or updip, at a very low rate and displacing oil toward production intervals in the lower portion of the formation or downdip. By injecting the displacement fluid at a low rate, fingering of the displacement fluid through the oil is avoided. This process is termed "gravity-stable". A "critical rate" or maximum rate of injection to obtain the desired "gravity-stable" displacement can be computed. The calculation of "critical rate" is described in reservoir engineering texts (see for example, Stalkup, F. I. "Miscible Displacement", Society of Petroleum Engineers, New York, 1984). Oil drainage may be an additional mechanism of oil recovery in a "gravity-stable" process.

The amount of immobile oil remaining in a porous rock after introduction of a high pressure non-aqueous displacement fluid in a tertiary recovery process with either a "slug" process and/or a WAG process and after displacement of a portion of the waterflood residual oil is herein denoted "$S_{orm}$". This term is therefore used herein for describing residual oil from "miscible", "near-miscible" and "immiscible" tertiary gas injection recovery processes. The residual oil left in the formation after such a process may have a higher average molecular weight than the original oil in place before introduction of the displacement fluid because the displacement fluid can remove various low molecular weight oil components from the original oil. $S_{orm}$ is defined herein as the volume fraction of pore space occupied by a substantially degassed liquid hydrocarbon phase (i.e., substantially degassed of dissolved light hydrocarbon gases or/and other oil components) after the displacement process.

Recoverable oil from the formation by a "tertiary gas injection process" can be determined from $S_{orm}$ using one or more computer simulations of fluid flow in the reservoir. Computer codes for reservoir flow simulation are commercially available and are well know to those skilled in the art. Estimation of recoverable oil requires, in addition to $S_{orm}$, estimation of the uniformity of contact of the displacement fluid with the reservoir, or sweep efficiency. Contact of the displacement fluid with the reservoir can be limited by channeling of the displacement fluid through high permeability streaks and by migration of the displacement fluid to the upper portion of the reservoir due to its low density, an effect referred to as "gravity override". Insight into sweep efficiency can be obtained through computer simulation of flow patterns in the reservoir using a reservoir model that is constructed from geological information and from results of various studies of the properties of core materials and reservoir fluids. Estimation of sweep efficiencies can also be obtained by comparison to other field projects with similar reservoir conditions conducted with similar displacement fluids (i.e. "look-alike" projects). For secondary gasflood projects, estimation of recoverable oil from $S_{org}$ also requires reservoir flow simulations and comparison to "look-alike" projects.

Injection of high pressure gases in the oil field requires significant investment in surface facilities, such as compressors and other gas handling equipment, as well as development of a large source of the displacement fluid. Because the remaining oil saturation can be used by those skilled in the art to estimate recoverable oil, $S_{orm}$ and $S_{org}$ are key properties for proper economic evaluation of planned projects and for efficient operation of existing projects. After a secondary gasflood or tertiary gas injection project has begun, an immobile residual oil saturation near the wellbore can be estimated by logging or coring methods, but the results obtained may not be representative of values throughout the reservoir.

Typically, $S_{orm}$ and $S_{org}$ values are determined from laboratory tests that mimic oil displacement processes in the reservoir. These tests are referred to as "reservoir-condition coreflood tests" or "lab corefloods". Lab corefloods, however, are time-consuming and expensive. Moreover, lab corefloods often involve work at high temperature and high pressure conditions, thus requiring a specialized laboratory apparatus.

Therefore, a long-felt need has existed in the industry for a simple, practical method to determine $S_{orm}$ or $S_{org}$ for use in initial planning studies or in simulation studies. Preferably, such a method would require only readily available information on the reservoir and its fluids such as density or API gravity and the composition of the produced oil. Other data on actual reservoir conditions and fluid properties, when available, could also be used for such a method.

SUMMARY OF INVENTION

According to the invention, there is provided a method for producing a hydrocarbon liquid from a subterranean formation resulting from introducing a substantially non-aqueous displacement fluid into said formation, comprising:

a) determining a solubility parameter for the hydrocarbon liquid in said formation before introducing said displacement fluid into said formation;

b) determining a solubility parameter for the displacement fluid before introducing it into said formation;

c) determining the difference between said hydrocarbon liquid and displacement fluid solubility parameters;

d) pre-determining from the said difference the amount of hydrocarbon liquid that should remain in said formation resulting from introducing said displacement fluid into said formation; and e) producing at least a portion of said hydrocarbon liquid.

The displacement fluid used in such a method for producing a hydrocarbon liquid may be injected as either a single bank or in alternating sequence with water.

DETAILED DESCRIPTION OF THE INVENTION

Solubility Parameter Definition

Figure 1:
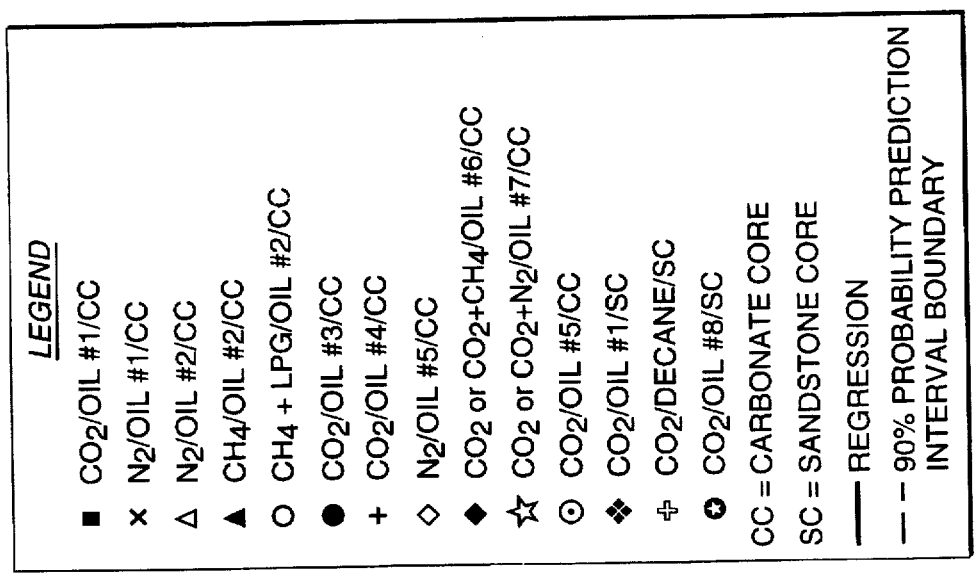
FIGURE 1 is a plot demonstrating dependence of the experimentally measured $S_{orm}$ on the absolute value of the difference in solubility parameters between the reservoir hydrocarbon liquid and the displacement fluid for a variety of displacement fluids and crude oils.
Figure 1:
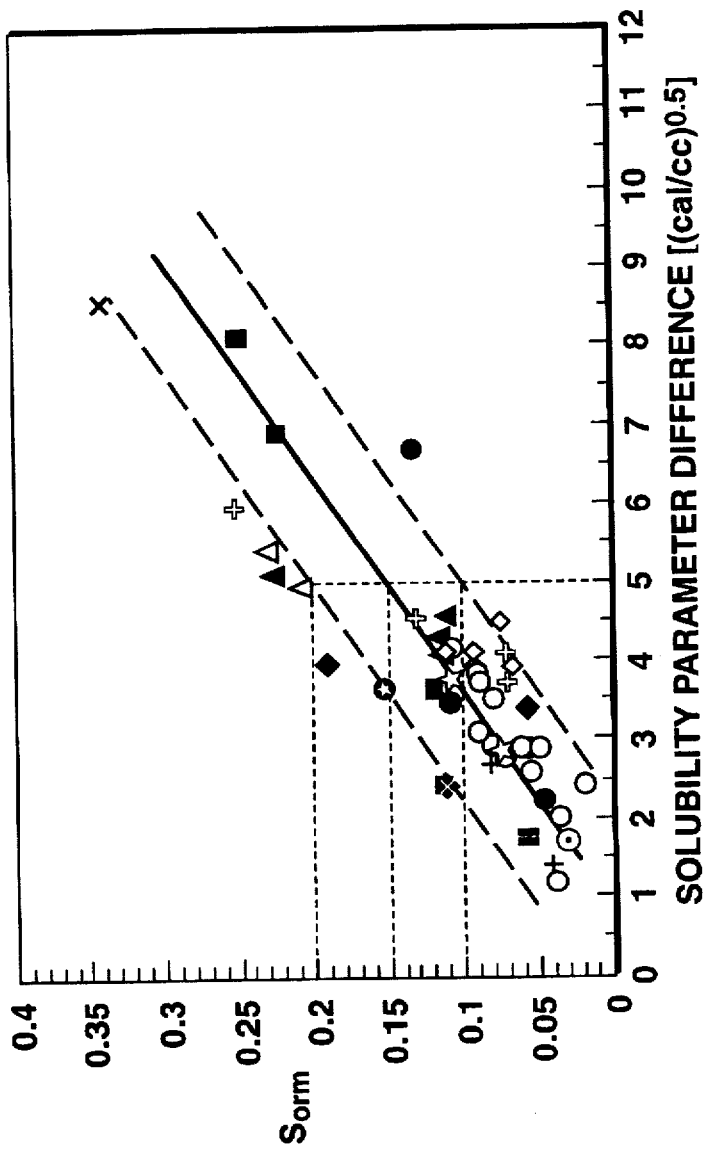

The invention described herein provides a practical and convenient method for estimating residual oil saturation, $S_{orm}$. Applicant has found an unexpected and surprising correlation between $S_{orm}$ and solubility parameter difference between a reservoir's oil/gas mixture and the proposed displacement fluid. The procedure described below illustrates how $S_{orm}$ can be predetermined with reasonable accuracy using the solubility parameters of the hydrocarbon liquid in the reservoir and the displacement fluid proposed for facilitating recovery of the fluid from the reservoir.

Before introducing a displacement fluid in a subterranean formation or reservoir, the chemical and physical properties of the hydrocarbon liquid in the reservoir may be represented by a "solubility parameter" for the hydrocarbon liquid. A solubility parameter is determined at the temperature and pressure conditions of the reservoir.

Generally, solubility parameters have been used in physical chemistry to characterize liquids, particularly non-polar liquids. The common definition of the solubility parameter is the square root of the ratio of energy of vaporization to molar volume, as, $$\delta = (\Delta E_{vap}/V)^{0.5} \qquad [eq. 1]$$

where $\Delta E_{vap}$=energy of vaporization, in units of cal/mole;

V=molar volume, in units of cc/mole.

The solubility parameter defined in eq. 1 is often termed the "Hildebrand solubility parameter" or the "Hildebrand-Scatchard solubility parameter". Generally, liquids or fluids with closer δ values will have a greater affinity for each other, and thereby, are more likely to form a solution with each other. The solubility parameter defined by eq. 1 is used in the "Example" presented below, but the practice of this invention is not strictly limited by solubility parameters so defined.

Determining Hydrocarbon Liquid Solubility Parameters

The hydrocarbon liquid in the reservoir is a complex mixture of many compounds of differing chemical structure. Several methods are available to determine a solubility parameter for this fluid to those skilled in the art. Three methods are described briefly below. Other methods for determining solubility parameters for crude oils may be apparent to those skilled in the art in light of these examples.

As the first example, the solubility parameter can be determined from the definition of eq. 1 if a molar energy of vaporization of the hydrocarbon liquid can be measured or estimated, and if the liquid's molar volume can be measured. One approach to estimate an energy of vaporization is through an equation of state for the crude oil.

As the second example, a "model compound" method may be used to determine an effective solubility parameter for the hydrocarbon liquid by treating the hydrocarbon liquid as a mixture of various compounds for which solubility parameter values are known in the literature. A set of such model compounds that can be used to represent a crude oil are listed in Table 1 below. Also shown in Table 1 is a grouping of the model compounds to represent specific fractions of the oil. For example, the oil components with 6 carbon numbers ($C_6$) can be represented by three model compounds: hexane, cyclohexane and benzene.

The relative amount of each model compound in the model oil mixture is assigned based on chemical analyses of the oil. These analyses include measurements of the relative amounts of linear saturates, cyclic saturates, aromatics, NSO (nitrogen-sulfur-oxygen) compounds and asphaltenes in the oil as well as the molecular weight distribution within the oil. The molecular weight distribution can be represented as a distribution of mass contained in individual carbon number "fractions", such as $C_6$, $C_7$, and so on. From the molecular weight distribution and effective densities of various oil fractions, a volume fraction distribution of components can be computed. Finally, an effective solubility parameter for the mixture is computed as a volume-fraction-weighted average of solubility parameter values for the model compounds of the mixture at the reservoir temperature.

TABLE 1

Example Representation of a Reservoir Hydrocarbon Liquid With "Model Compounds"

| Component | Model Compounds |
|---|---|
| Light components and dissolved gases | Pure component ($CO_2$, $N_2$, $CH_4$, $C_2H_6$, $C_3H_8$, butanes, pentanes) |
| $C_6$ | Mixture of n-hexane, cyclohexane and benzene |
| $C_7$ | Mixture of n-heptane, methylcyclohexane and toluene |
| $C_8$ | Mixture of n-octane, methylcyclohexane and xylene |
| $C_9$–$C_{12}$ | Mixture of n-nonane, decalin and naphtalene |
| $C_{13+}$ | Mixture of eicosane, decalin, anthracene, thiophene, and asphaltenes |

As a third example, an effective solubility parameter for the hydrocarbon liquid can be determined from the hydrocarbon liquid's average molecular weight, MW, and the temperature of the subterranean reservoir, $T_{res}$, using the following empirical relationship, $$\delta_{hc} = 0.01 \times MW + 6.54 - 0.01 (T_{res} - 25) \quad [eq. 2]$$

where $\delta_{hc}$=solubility parameter of reservoir hydrocarbon liquid in reservoir, in units of $(cal/cc)^{0.5}$;

$T_{res}$=reservoir temperature, in units of °C.;

MW=average molecular weight of reservoir hydrocarbon liquid before introduction of the displacement fluid, in units of g/mole.

Determining Displacement Fluid Solubility Parameters

The solubility parameter is then determined for the substantially non-aqueous displacement fluid before introducing the fluid in the subterranean reservoir. Preferably, the solubility parameter should be determined at the temperature and pressure conditions at which the displacement fluid will be injected or otherwise introduced into the reservoir. The definition of the solubility parameter is the same as that used for the reservoir hydrocarbon liquid.

In the preferred embodiment, the solubility parameter of the displacement fluid is computed from the following expression proposed by J. C. Giddings, et al (Science, 162, Oct. 4, 1968, pp. 67–73) if the displacement fluid is a high pressure gas or a supercritical fluid:

$$\delta_{df} = 1.25 (P_c)^{0.05} (\rho_r / \rho_r(liq)) \quad [eq. 3]$$

where $\delta_{df}$=solubility parameter of displacement fluid, in units of $(cal/cc)^{0.5}$;

$P_c$=critical pressure of displacement fluid, in units of atmospheres;

$\rho_r$=reduced density, defined as ratio of density to the critical density;

$\rho_r(liq)$=reduced density of fluid compressed to the liquid state, taken to be constant of 2.66.

If the displacement fluid is a liquid, reference literature values for the solubility parameter of that liquid should be used. When the displacement fluid is a mixture of components, an effective solubility parameter of the mixture can be computed as a volume-fraction-weighted average of the solubility parameters for individual components.

Correlating $S_{orm}$ or $S_{org}$ With Solubility Parameter Differences

The $S_{orm}$ as defined previously is determined from the absolute value of the difference in solubility parameters between the hydrocarbon liquid, $\delta_{hc}$, and the displacement fluids, $\delta_{df}$. In the preferred embodiment of this invention, $S_{orm}$ is determined from the plot shown in FIGURE 1 or from eq. 4 below. The $S_{orm}$ values illustrated in FIGURE 1 were obtained in reservoir-condition tertiary lab coreflood tests that mimicked the processes of waterflooding and various tertiary gas injection processes. The data points shown in FIGURE 1 primarily represent miscible or near-miscible recovery processes with a few immiscible data points also included.

As indicated in the figure legend, displacement fluids in these experiments included $CO_2$, $N_2$, methane, blends of methane and "LPG" or "liquefied petroleum gas", a $CO_2$-methane blend and a $CO_2$—$N_2$ blend. The "LPG" consisted of predominantly ethane with lesser amounts of propane, butane and higher hydrocarbons in this case. Results with eight different crude oils are shown as well as results with a pure oil, decane. The average molecular weight of the hydrocarbon fluids or "oils" spanned the range of 63 g/mole to 262 g/mole. Temperatures for the tests ranged from 38° C. to 140° C., and pressures spanned the range from 1015 psia to 4015 psia [7.0 MPa to 27.7 MPa]. Tests were conducted in outcrop carbonate cores, carbonate reservoir cores, and sandstones, representing a range of reservoir rock types and permeabilities. Some experiments were also conducted with alternating injection of a non-aqueous displacement fluid and water to represent the "WAG" processes.

Cores were mounted in both vertical and horizontal configurations. The vertical tests were conducted at low injection rates but the injection rate was designed to be greater than the "critical rate" for "gravity-stable" processes. Therefore, the correlation developed under the above procedures represents "non-gravity-stable" conditions. Nonetheless, this correlation can be applied to a "gravity-stable" condition. In such a case however, the predetermined $S_{orm}$ value will likely represent a maximum value. A correlation between $S_{org}$ and solubility parameter difference may be developed in a similar manner.

Applying the Correlation

In FIGURE 1, actual $S_{orm}$ values determined from the lab coreflood tests are plotted on the y-axis versus the absolute value of the solubility parameter difference between the hydrocarbon liquid and the displacement fluid used in the corresponding lab coreflood test, plotted on the x-axis. The solubility parameters calculated for the hydrocarbon liquid and the displacement fluid used in each coreflood test were calculated using the model compound method and eq. 3, respectively. The solid line represents the least-squares regression line, and is considered the "most likely" value. The heavy dashed lines, parallel to the regression line, represent the 90% probability prediction interval, which means there is a 90% probability that a new measured value would fall on or between the heavy dashed lines for a given solubility parameter difference. Accordingly, the $S_{orm}$ for a miscible or near-miscible reservoir flood can be reasonably predicted by determining the solubility parameter difference between the hydrocarbon liquid in the formation and the proposed displacement fluid and then correlating that difference to the corresponding $S_{orm}$ on the y-axis.

For example, using the least-squares regression line in FIGURE 1 for determining the corresponding $S_{orm}$, a solubility parameter difference of 5 yields a "most likely" $S_{orm}$ equal to about 0.15, a high $S_{orm}$ equal to about 0.20, and a low $S_{orm}$ equal to about 0.10.

Alternatively, the "most likely" $S_{orm}$ value can be determined from the following expression:

$$S_{orm}=0.0362(|\delta_{hc}-\delta_{sf}|)-0.0291 \quad \text{[eq. 4]}$$

The $S_{orm}$ value so determined can then be used in computer simulation studies of the oil recovery process in the reservoir, or the $S_{orm}$ value can be scaled by those skilled in the art to estimate recoverable hydrocarbon from the reservoir as a result of introduction of a large volume of the non-aqueous displacement fluid into the reservoir. Scaling of the $S_{orm}$ value is specific to a given reservoir. The following example will serve to illustrate the preferred procedure for estimation of $S_{orm}$.

EXAMPLE 1

A hypothetical oil reservoir contains a reservoir hydrocarbon liquid with average molecular weight of 103 g/mole. The temperature of the reservoir is 110° C. (230° F.). Under these conditions, the solubility parameter of the oil can be determined to be 6.72 [(cal/cc)$^{0.5}$] from eq. 2. The displacement agent of interest is pure $CO_2$, and the desired injection pressure is 2515 psia [17.3 MPa]. The solubility parameter of the injected gas can be determined to be 3.07 [(cal/cc)$^{0.5}$] from eq. 3. The absolute value of the solubility parameter difference is 3.65 [(cal/cc)$^{0.5}$], and the "most-likely" $S_{orm}$ value is determined from eq. 4 to be 0.10 PV. The $S_{orm}$ value determined from this method could then be used in computer flow simulation studies with a reservoir model to scale $S_{orm}$ to recoverable oil or to study other aspects of the tertiary recovery process.

Correlating Solubility Parameter and Minimum Miscibility Pressure

The unexpected correlation of $S_{orm}$ data with the solubility parameter difference led Applicant, also, to consider using the solubility parameter difference as a tool for predicting other useful properties for design of tertiary gas injection processes that are typically determined experimentally. Consequently, Applicant has also learned of an unexpected relationship between solubility parameter difference and minimum miscibility pressure ("MMP"). The MMP is commonly defined as the minimum pressure at which multiple-contact miscibility can be obtained between a crude oil and a displacement fluid of interest. MMP measurements for several crude oils have been disclosed in various articles in the open literature. Applicant has calculated the corresponding solubility parameter difference for each MMP based on the crude oil and injected gas disclosed by each reference. The MMP's, produced by either a slim-tube or "rising bubble" test method, disclosed in various literature articles are listed in Table 2. The solubility parameter difference corresponding to each oil/gas combination listed have been calculated by Applicant and are provided in Table 2 accordingly.

TABLE 2

SOLUBILITY PARAMETER DIFFERENCE AND MMP

| Oil Description | Injected Gas | Oil MW (g/mol) | Temp. (°C.) | MMP (psia) | \|Δδ\| ((cal/cc)$^{0.5}$) |
|---|---|---|---|---|---|
| Bandini | $CO_2$ | 171 | 58 | 1850 | 3.5 |
| Bandini | $CO_2$ | 171 | 74 | 2450 | 3.0 |
| Mead-Strawn | $CO_2$ | 183 | 57 | 1900 | 3.3 |
| N. Dundas | $CO_2$ | 214 | 74 | 3000 | 2.6 |
| Wilmington-Ford | $CO_2$ | 254 | 54 | 2450 | 2.8 |
| Wilmington-Ford | $CO_2$ | 254 | 74 | 3400 | 2.6 |
| Oil-4 | $CO_2$ + HC | 89 | 53 | 1865 | 2.8 |
| "Middle East Oil" | HC | 98 | 124 | 4000 | 3.0 |
| "Reservoir Oil"* | HC | 200 | 82 | 4755 | 3.7 |
| Oil-9 | HC | 83 | 97 | 3280 | 2.9 |

HC = mixtures of methane with LPG or other hydrocarbon gases
*"Rising bubble" method As indicated in Table 2, the solubility parameter difference ranged from 2.6 to 3.7 (cal/cc)$^{0.5}$, yielding an average solubility parameter difference of 3.0 (cal/cc)$^{0.5}$. A similar correlation may also exist between the solubility parameter difference and MME.

This unexpected correlation between MMP or MME and solubility parameter difference can be used as tool for calculating a MMP or MME, thereby eliminating the need for experimental testing. To predict MMP, for example, the solubility parameter of a the displacement fluid or gas at several pressures can be estimated using equation 3 and the solubility parameter difference of the hydrocarbon liquid or oil can be estimated using equation 2. The pressure condition that yields a value of |Δδ|≅3.0 (cal/cc)$^{0.5}$ is approximately the MMP. Also, the gas composition that yields a value of $|\Delta\delta|\cong 3.0$ $(cal/cc)^{0.5}$ at the pressure of interest is approximately the MME for that pressure. This procedure can also be used to extrapolate experimental MMP data obtained with one gas composition, such as pure $CO_2$, to other gases, such as $CO_2$ diluted with separator gases, by matching the solubility parameter difference between gas and oil at the MMP condition in each case.

The principle of the invention and the best mode contemplated for applying that principle have been described. It is to be understood that the foregoing is illustrative only and that other means and techniques can be employed without departing from the true scope of the invention defined herein.

What I claim is:

1. A method for predetermining the amount of a hydrocarbon liquid remaining in a subterranean formation resulting from introducing a substantially non-aqueous displacement fluid into said formation and producing at least a portion of the hydrocarbon liquid, comprising:

a) determining a solubility parameter for the hydrocarbon liquid in said formation before introducing said displacement fluid into said formation;

b) determining a solubility parameter for the displacement fluid before introducing it into said formation;

c) determining the difference between said hydrocarbon liquid and displacement fluid solubility parameters;

d) predetermining from the said difference the amount of hydrocarbon liquid that should remain in said formation resulting from introducing said displacement fluid into said formation;

e) introducing a substantially non-aqueous displacement fluid into said formation; and f) producing at least a portion of said hydrocarbon liquid.

2. The method of claim 1 further comprising estimating the producible portion of said hydrocarbon liquid from said subterranean formation using the difference between:

(a) the amount of hydrocarbon liquid in said formation before introducing said displacement fluid into said formation, and (b) the amount of hydrocarbon liquid that should remain in said formation as predetermined in step (d).

3. Method of claim 1 wherein said displacement fluid is introduced into said formation as a single bank.

4. Method of claim 1 wherein said displacement fluid is introduced into said formation in an alternating sequence with aqueous fluid.

5. The method of claim 1 wherein said displacement fluid is a gas.

6. The method of claim 1 wherein said displacement fluid is a supercritical fluid.

* * * * *